Oct. 6, 1953 D. T. SCALISE 2,654,851
BEAM DEFLECTOR
Filed Jan. 24, 1952 5 Sheets-Sheet 1

INVENTOR.
DOMINIC THEODORE SCALISE
BY
Roland A. Anderson
ATTORNEY.

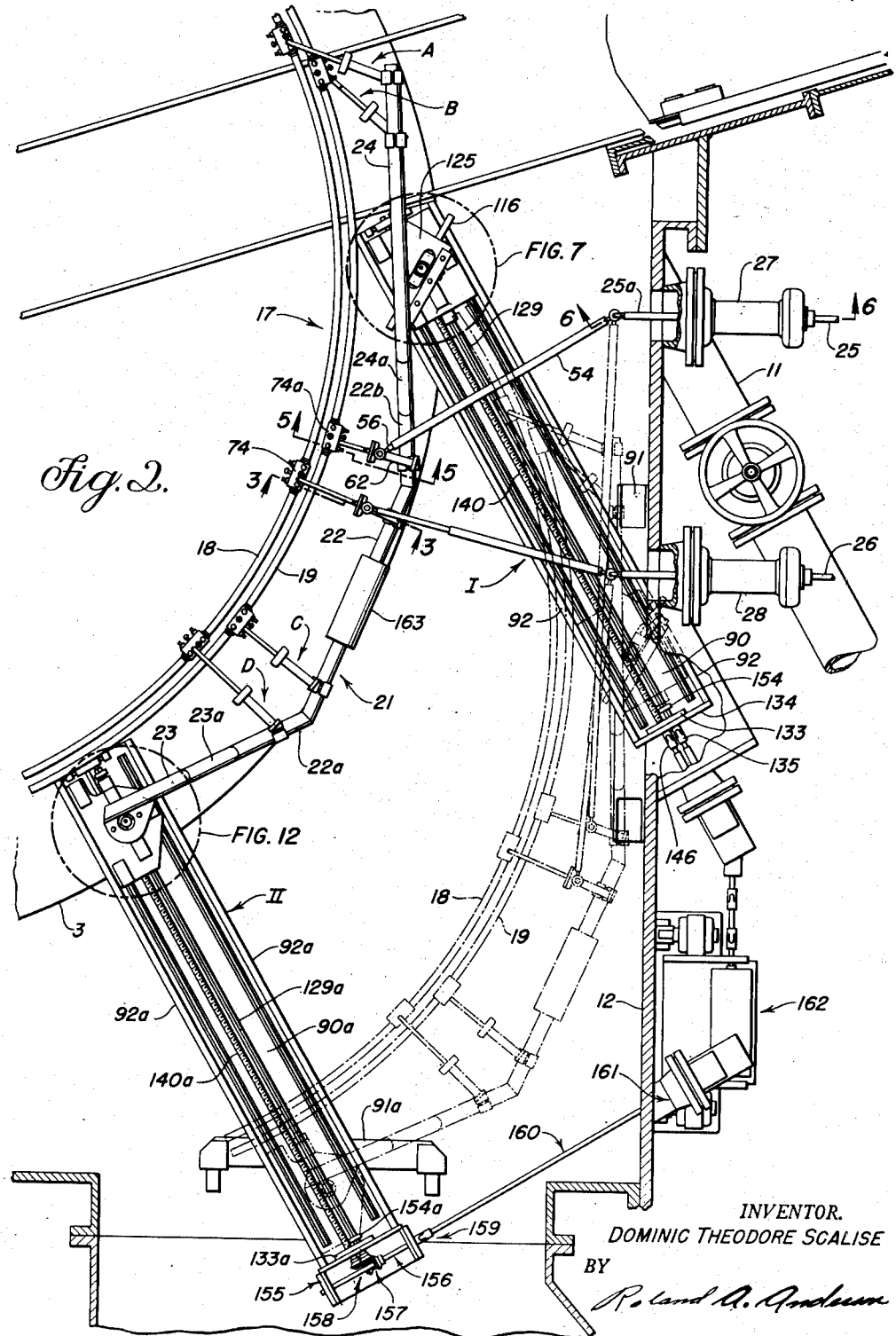

Oct. 6, 1953 D. T. SCALISE 2,654,851
BEAM DEFLECTOR
Filed Jan. 24, 1952 5 Sheets-Sheet 3

INVENTOR.
DOMINIC THEODORE SCALISE
BY
Roland A. Anderson
ATTORNEY.

Oct. 6, 1953
D. T. SCALISE
2,654,851
BEAM DEFLECTOR
Filed Jan. 24, 1952
5 Sheets-Sheet 4
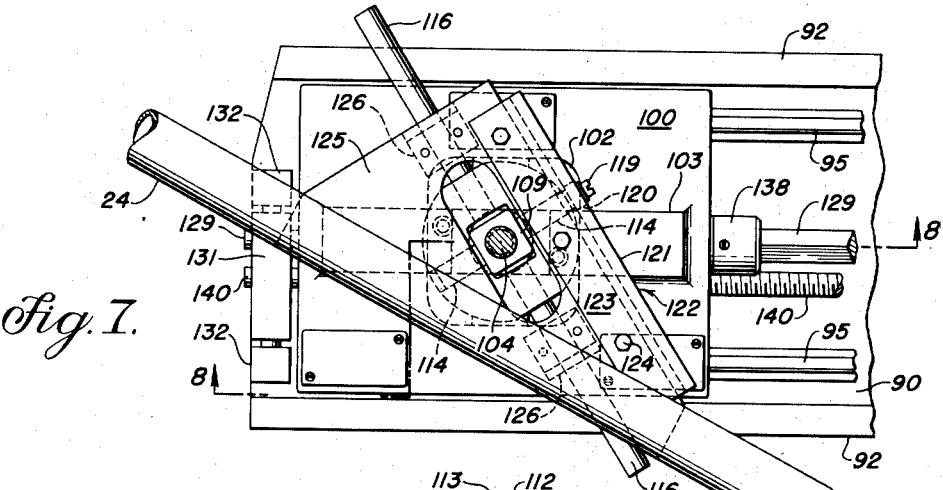
Fig. 7.
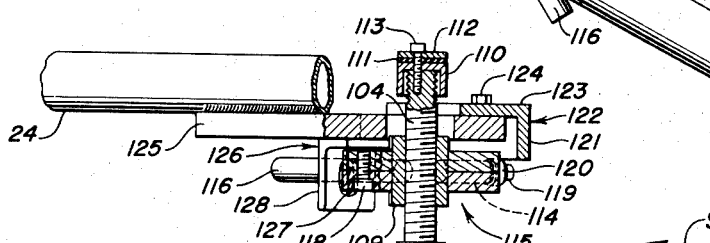
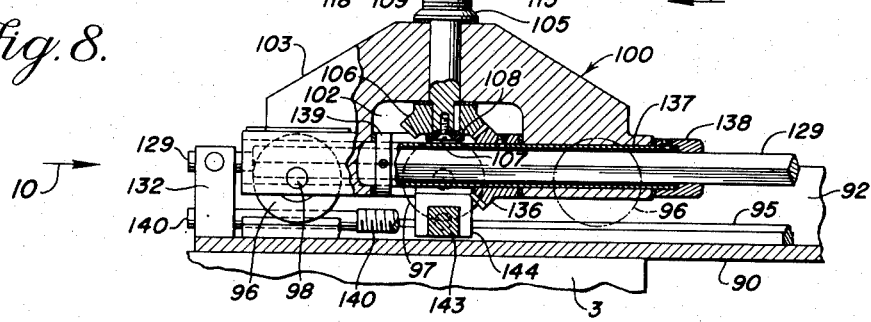
Fig. 8.
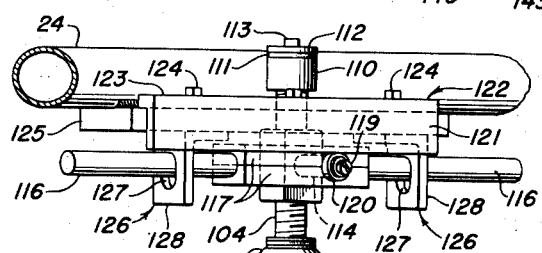
Fig. 9.
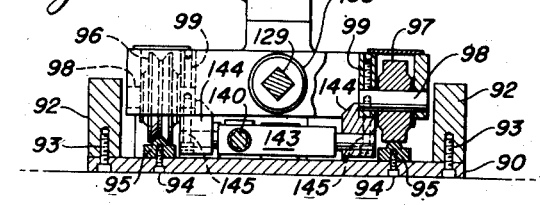
Fig. 10.
INVENTOR.
DOMINIC THEODORE SCALISE
BY
Roland A. Anderson
ATTORNEY.

Oct. 6, 1953 D. T. SCALISE 2,654,851
BEAM DEFLECTOR
Filed Jan. 24, 1952 5 Sheets-Sheet 5
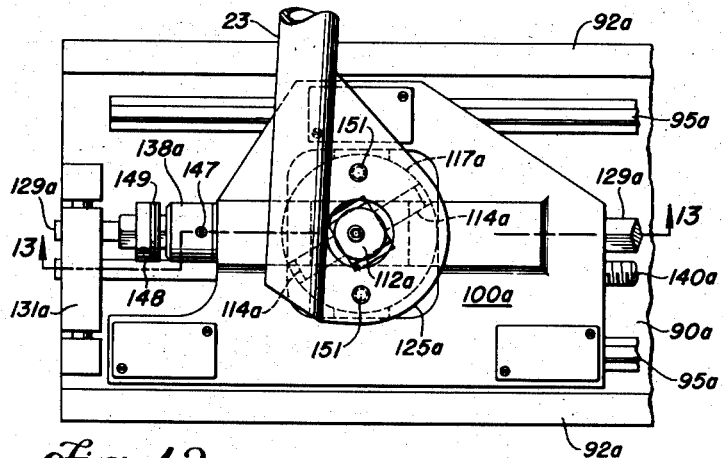
Fig. 12.
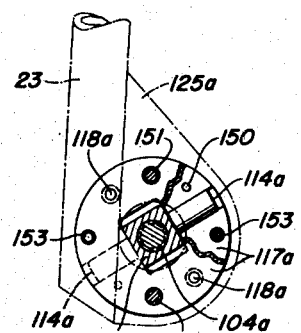
Fig. 14.
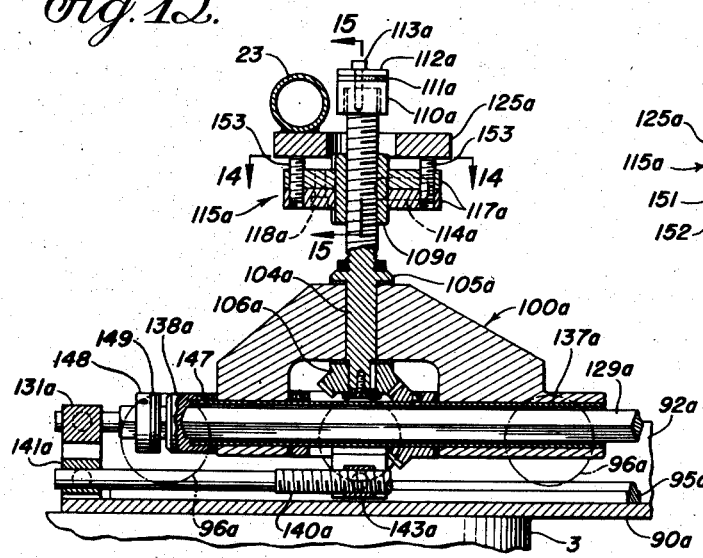
Fig. 13.
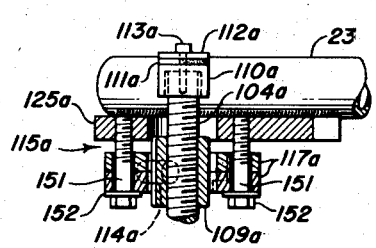
Fig. 15.
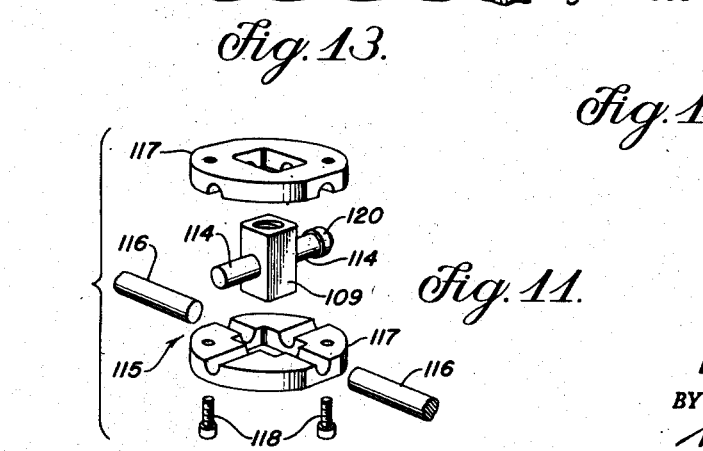
Fig. 16.
Fig. 11.
INVENTOR.
DOMINIC THEODORE SCALISE
BY
Roland A. Anderson
ATTORNEY.

Patented Oct. 6, 1953

2,654,851

UNITED STATES PATENT OFFICE 2,654,851

BEAM DEFLECTOR

Dominic Theodore Scalise, Richmond, Calif., assignor to the United States of America as represented by the United States Atomic Energy Commission Application January 24, 1952, Serial No. 268,071

18 Claims. (Cl. 313—62)

This invention relates to beam deflectors for particle accelerators and particularly to those of the cyclotron type wherein ions travelling in circular orbits are repeatedly accelerated in consequence of which such orbits increase in radii and, thereafter, ions in a preselected orbit are withdrawn from the accelerator. The copending application of Wilson M. Powell, Serial No. 44,649, filed August 17, 1948, for Beam Extractor, discloses an apparatus which has been found to be quite efficient for removing ions of any desired energy from an ion accelerator.

The apparatus of the foregoing copending application comprises, in general, a plurality of curved and spaced conductive bars disposed about an outer path of travel of the ionized particles and having connected thereto a high voltage pulsing source for applying a direct current pulse of extremely short duration. The effect of the pulsed bars is to alter the radial center of the particle orbit so that upon leaving the influence of the former the particles enter a region of diminished flux intensity from the field of the accelerator and may be guided out of the accelerator. A magnetic shield of unique construction for reducing the magnetic flux acting on the particles is disclosed in the foregoing application and is employed with minor changes in conjunction with the beam deflector of this invention, the latter constituting an improvement over the structure disclosed in said Powell application.

Accordingly, it is an object of this invention to provide a beam deflector of improved design and incorporating important and advantageous features as will appear from the detailed description set forth in the present specification.

A more specific object of the present invention is to provide a beam deflector that is mounted for movement from an operable position in the path of accelerated particles into a radially spaced outer and inoperable position, thus permitting the alternate use of probe targets, for example, in the space normally occupied by the deflector.

Another object of the invention is to provide a beam deflector mounted for movement as a unit rectilinearly into and out of the path of accelerated particles and, in addition, one that may be adjusted vertically in order to maximize the beam during operation.

A further object of this invention is to provide a beam deflector having sufficient relative adjustability of its terminal portions that the final orbit of the particles may be altered by a reversal of the usual deflector bar potentials and the beam consequently brought out of the accelerator tank at a different point than is customary.

Another object is to provide a beam deflector having not only selective vertical adjustment of its terminal portions but also selective and major horizontal adjustment.

A still further object of the invention is to provide a beam deflector having electrodes of substantially shorter radiation half-life than the customary copper bars, specifically, carbon.

Other objects and advantages of the invention will become evident from the following detailed description and by reference to the accompanying drawings of a preferred embodiment and wherein:

Fig. 2 is an enlarged view of a portion of Fig. 1 showing the beam deflector in operating position in solid lines and in retracted position in broken lines;

Fig. 7 is a plan view of the portion of the deflector actuating mechanism circled by indicated broken lines in the upper part of Fig. 2;

Fig. 8 is an elevational view partly in section as taken on the line 8—8 of Fig. 7;

Fig. 9 is a right side elevation of Fig. 8, partly in section, and viewed as indicated by the single arrow in the latter;

Fig. 10 is a partial elevation viewed from the left of Fig. 8 as indicated by the arrow;

Fig. 11 is an exploded view of the universal type joint shown in section in the upper portion of Fig. 8;

Fig. 12 is a plan view of the portion of the deflector actuating mechanism circled by indicated broken lines in the lower part of Fig. 2;

Fig. 13 is a vertical sectional view taken on line 13—13 of Fig. 12;

Fig. 14 is a plan view taken on line 14—14 of Fig. 13 with a portion of the upper plate 117a broken away;

Fig. 15 is a vertical sectional view taken on line 15—15 of Fig. 13; and

Fig. 16 is an exploded view of the universal type joint shown in Figs. 13, 14, and 15.

Figure 1:
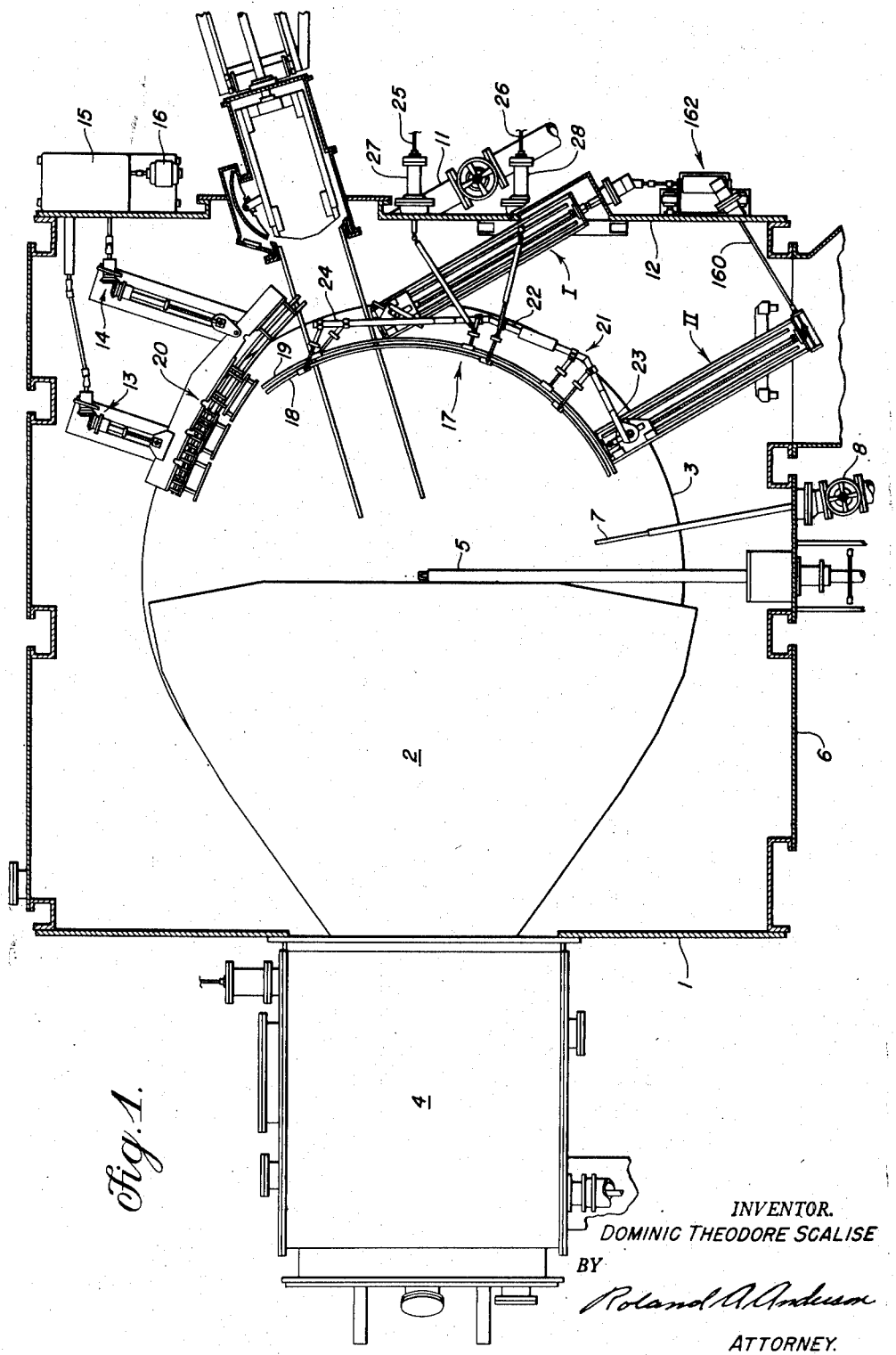
Figure 1 is a plan view of the beam deflector and associated apparatus with the accelerator tank wall shown in section.

Before proceeding with the constructional features and mode of operation of the present improvement, brief reference to associated apparatus more fully disclosed in the Powell application supra, is believed to be in order, as making more readily apparent the environment as well as the operational factors and problems posed by, and in substantial measure, solved by applicant's invention as will later appear. Accordingly, reference is now made to Fig. 1 of the drawing wherein reference numeral 1 indicates the generally rectangular evacuated chamber or tank of a conventional synchro-cyclotron. Chamber 1 encloses a pair of parallel D-shaped electrodes 2, only one of which is visible in this view, mounted in the magnetic field of a coaxial and spaced pair of magnet poles, only the lower of which indicated at 3 is shown. The D electrodes 2 are suitably supported in the chamber 1 by means (not shown) disposed within a housing 4 which is connected to chamber 1. Such housing also contains energizing apparatus for the synchrotron-cyclotron and is fully disclosed in the Powell application above referred to. Other conventional apparatus includes an ion source 5 extending through a wall 6 of the chamber 1, a probe 7 also extending into the latter and radially extensible through means 8 to sample any desired orbit of the ionized particles during acceleration, and a magnetic shield indicated generally at 20 which receives the orbitally shifted particles and guides them into an exit tube 11 mounted in a wall 12 of chamber 1. Magnetic sheld 20 may be radially advanced or retracted across the path of the particles by means of gearing generally indicated at 13 and 14, in a manner similar to that shown in said Powell application with the use of selectively variable speed control means such as indicated at 15 and actuated by motor means 16.

The beam deflector with which the present application is concerned is indicated generally by the reference numeral 17 and includes a plurality, two pairs as 18 and 19, for example, of curved deflector bars of square cross-section made of copper as is disclosed in the Powell application supra, but preferably of material having a significantly shorter half-life, such as carbon. An important advantage of the latter provision is the proximate adjustment, inspection, etc. of the deflector within a shorter time after use and the greater safety to an operator when so doing.

The pairs of deflector bars 18, 19 have connected thereto supporting means, the particular arrangement of which forms an important part of the present invention and also means for supplying the desired energizing potentials to said bars. As a proximate support for bars 18, 19 there is provided a frame of metal tubing generally indicated at 21 fabricated, for convenience, of a central section 22 angularly united as by welding, to end sections 23 and 24 which extend inwardly toward a tangential but spaced relation with bars 18, 19. It is preferred that the end sections 23, 24 be disposed not only angularly with respect to central section 22 as shown in Fig. 2 but also within a plane parallel to the two upper bars and above a parallel plane containing the central section 22. Accordingly the latter section is, in fact, united to end section 23 through an upwardly extending intermediate section 23a (Fig. 2), an angularly extending section 22a co-planar with central section 22 completing this portion of the fabrication.

Similarly, end section 24 is connected by means of a downwardly extending intermediate section 24a, and an angularly extending section 22b which is co-planar with central section 22.

Figure 6:
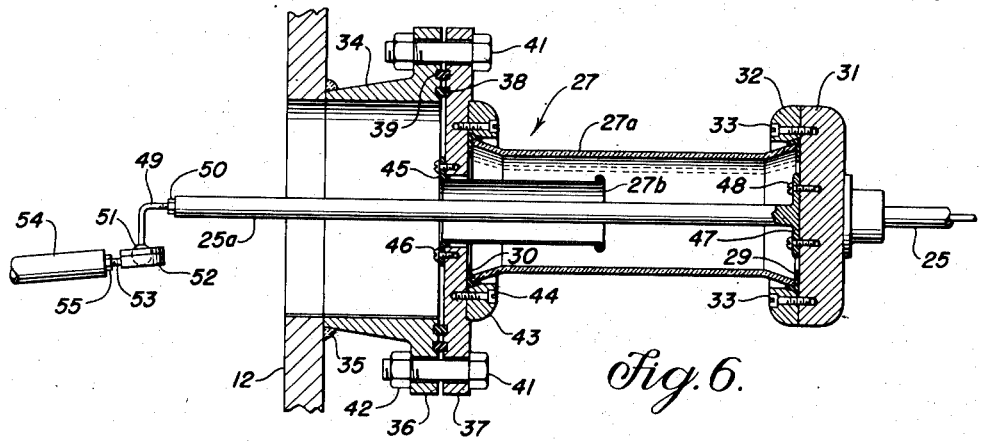
Fig. 6 is a vertical sectional view of one of the high voltage bushings and is taken on the line 6—6 of Fig. 2.

Means for supplying bars 18, 19 with their energizing potentials will now be described. From Fig. 2 it will be seen that leads 25, 26 from a suitable supply are centrally disposed in insulator bushings 27, 28, respectively, which are rigidly mounted on the chamber wall 12. As detailed in Fig. 6, bushing 27, for example, comprises suitably united concentric cylinders 27a and 27b of insulating and conducting material, respectively. Outer cylinder 27a is formed with outwardly flaring terminal portions adapted to support resilient gaskets 29, 30 of annular configuration and V-shaped cross-section. The terminal portion of cylinder 27a disposed the greater distance from tank wall 12 is clamped between a disc-like terminal plate 31 and an annular retaining ring 32 which jointly provide a cooperating recess for receiving gasket 29 which is maintained in rigid assembly by a plurality of peripheral uniting means such as spaced bolts 33.

The flared portion of cylinder 27a adjacent tank wall 12 is mounted thereon by means of a stand-off cylindrical bushing 34 rim-welded at 35 to the mating aperture of wall 12 and having an opposite flange portion 36 adapted to receive in seating relation a centrally apertured plate 37, the outer face of which provides a seat for gasket 30. A plurality of co-planar, concentric gaskets 38, 39 are disposed in corresponding grooves in the mating surfaces of flange 36 and plate 37 for insuring hermetic sealing of these surfaces when the peripherally disposed bolts 41 extending through these juxtaposed elements are tightened by means of corresponding nuts 42. An annular retaining ring 43 similar to ring 32 serves to snugly grip the V-sectioned gasket 30 and thereby the flared terminal portion of cylinder 27a in hermetic relation by means of the spaced bolts 44 threaded into plate 37. Inner concentric cylinder 27b, previously referred to, is maintained in rigid co-axial relation to outer cylinder 27a by virtue of the integral mounting of its inner end upon a suitable annular ring 45 of conducting material mounted as by the screws 46 upon the inner face of plate 37. Central conductor 25a is preferably of solid cross-section and terminates outwardly in a contact disk 47 having excellent surface-electric contact with the inner face of plate 31 by means of uniting screws 48. From the foregoing it will be seen that there has been provided a high voltage bushing of the stand-off type and having excellent electrical characteristics despite the presence during operation of variable vacuum conditions in the interior thereof.

Since the means for transmitting the energizing potentials inwardly or to the left (Fig. 6) of the bushings 27, 28 to the bars 19 and 18 utilizes similar components except for a necessary modification of cross-over supports in the vicinity of the bars, the following description will be more readily understood by considering the sectional view (Fig. 3) in addition to the side elevation (Fig. 5); accordingly, it is to the latter that the immediately subsequent explanation is directed. Thus, it will be seen that the inner end of central conductor 25a receives in threaded relationship one end of an angularly conformed rod 49 which is secured in desired adjusted position by lock nut 50 and the opposite end of which terminates in a ball 51 retained in a socket member 52. The latter includes a threaded rod portion 53 which is adjustably secured in one end of an elongated, conducting tube 54 by means of lock nut 55. Telescopically received within tube 54 for the major portion of its length is an inner tube 56 (Fig. 5), only the outer end thereof being visible in Fig. 2. Such end receives the threaded portion of a ball and socket assembly similar to that just described and generally indicated by reference numeral 57 while the threaded opposite end of such assembly projects through an aperture provided in an upstanding ear 58 of a vertically extending socket type connector 59 of annular contour (Figs. 3 and 5) in which it is held in adjustably fixed relation by a pair of oppositely disposed lock nuts 61. Connector 59 is supported by the angularly extending section 22b of the frame 21 previously described, by means of a horizontally extending rod 62 of suitable dielectric material seated in the central recess of connector 59 and retained in rigid assembly therewith by screw 63. A split clamp 64 adjustably fixed on section 22b of frame 21 by screws 60 is provided with a vertical bore 65 into which the lower end of a cylindrical stud 66 is pressed, the latter being a lateral extension of a connector disc 67 one vertical face of which is seated against the outer end of rod 62 with which it is rigidly united by means of screw 68, for example, as will be readily apparent from Fig. 3.

Referring again to the latter figure it will be noted that the more immediate support for the inner bars 18 extends inwardly from connector 59 and preferably comprises a pair of curved tubular members 70, 71 vertically co-planar and having their outer ends seated in diametral bores in annular connector 59. Members 70, 71 are curved upwardly and downwardly respectively, as they recede from connector 59 and subsequently reverse direction and curve downwardly and upwardly to terminate over and under the respective bars. Integally united as by welding or brazing to each of members 70, 71 is a short length of angle cross-section, rigid conductor, extending in a direction normal to said members and parallel to bars 18, the legs 72, 73 of the upper angle-conductor 74 being disposed above and to the left respectively, of the upper bar while the legs 75, 76 of the lower angle-conductor 77 are disposed below and to the left respectively of the lower bar.

Figure 3:
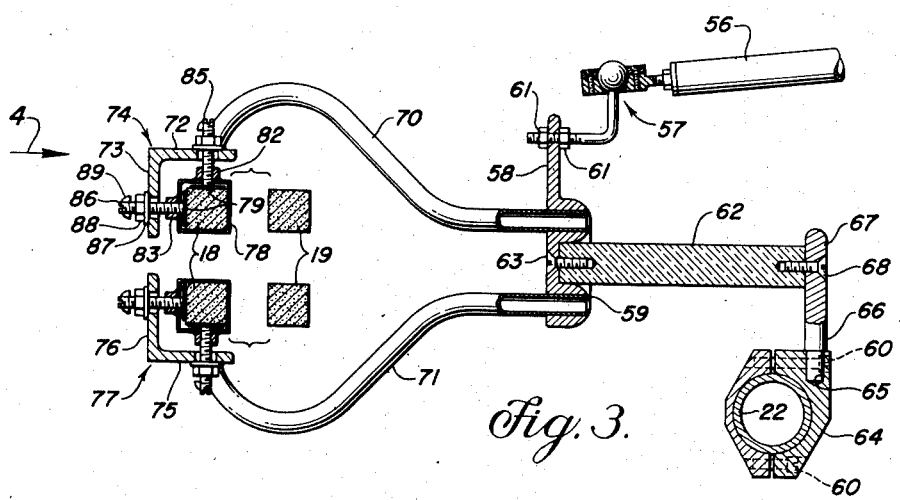
Fig. 3 is a side elevation, partly in section, of the electrical conductors for one pair of deflector bars and taken on the line 3—3 of Fig. 2.

For the purpose of adjustably clamping each of bars 18, 19 to its corresponding angle-conductor through a vertical range and also through a horizontal range as viewed in Fig. 3, means shown more particularly in Fig. 4 will now be described. Such means comprises a box-like sleeve 78 closely surrounding each of bars 18 but sufficiently spaced therefrom to admit an elongated, stiff strip 79 of metal conductor which bears against the adjacent surface of bar 18. By providing a similar strip 79 for the angularly disposed surfaces of bar 18 proximate the angle-conductor 74, pressure may be exerted between the remaining interior surfaces of sleeve 78 and the contiguous surfaces of bar 18. The latter action is obtained by suitably affixing to the outer surfaces of sleeve 78 which are disposed within the angle defined by legs 72, 73 a pair of longitudinally spaced, interiorly threaded bosses 82 and 83, respectively. Such bosses receive corresponding screws 85 and 86 extending through enlarged apertures in legs 72, 73 and are in pressure transmitting relation with the latter through washers 87 and nuts 88 disposed adjacent the outer surfaces of said legs. Through the provision of means such as screw 89 intermediate spaced screws 85 and threaded through an aperture in leg 72, for example, to bear on the outer surface of sleeve 78 a rigid, but adjustable positioning of angle-conductor 74 and upper bar 18 may be accomplished. A similar arrangement is provided for positioning lower bar 18 with respect to angle-conductor 77.

Figures 4, 5:
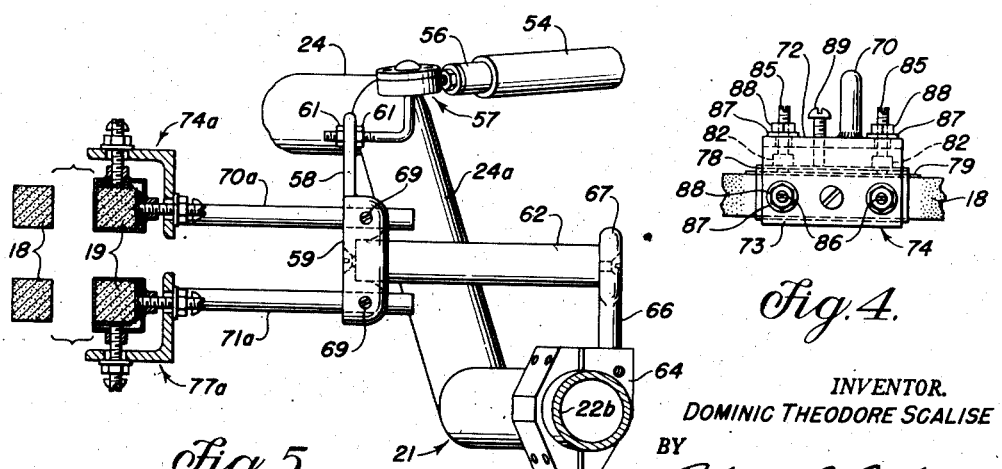
Fig. 4 is an end elevation of a portion of Fig. 3 and showing a deflector bar connector.
Fig. 5 is a side elevation, partly in section, of the electrical conductors for the other pair of deflector bars and taken on the line 5—5 of Fig. 2.

It will be noted that the arrangement just described pertains to the potential connections extending through high voltage bushing 28, the analogous arrangement for bushing 27 to the bars 19 permitting the simplified array including the straight tubular members 70a, 71a secured in connector 59 by means of screws 69 and terminally united to angle conductors 74a, 77a, respectively, as shown in Figs. 2 and 5.

It will be observed from the foregoing that the parts just described and disposed between the frame 21 and bars 18, 19 serve as a central support for the latter upon the former in addition to their function as electrical conductors from bushings 27, 28. Additional support for bars 18, 19 and spaced therealong is provided as shown in Fig. 2 as also clamped to frame 21. Such supporting means which is identical to that previously described except for the omission of the high voltage connection or ear 58 of connector 59 is generally indicated by the reference characters A, B, C and D in Fig. 2. From the preceding description it will be seen that the bars 18, 19 are supported by an insulated structure of light weight, small cross-section and rigidity compatible with its inherent adjustability.

Having described the immediate supporting structure for the bars 18, 19 upon the frame 21 and the pivotal connections of the high voltage conductors to bushings 27, 28 which remain intact throughout the permissible movement of frame 21 from its solid line position to the dotted line position shown in Fig. 2, and including the vertical movement of either or both ends of the frame, the mounting of the latter whereby such movement may be accomplished will now be explained. In general such mounting comprises two pairs of spaced tracks, a car on each pair of tracks, means carried by the cars for supporting the frame 21 at various elevations as desired and control means extending in the direction of the tracks to a control station located outside the cyclotron tank for elevating the frame upon the cars and for moving the latter selectively or in unison upon the track. The respective mounting assemblies are designated I and II, for convenience (Figs. 1 and 2), and are generally similar except in minor respects as noted hereinafter.

Considering first the assembly I, it will be seen from Figs. 2 and 7–10 that there is provided an elongated, rectangular bed plate 90 having its inner end resting and secured to the magnet pole 3 and supported adjacent its outer end by a bracket 91 mounted on the bottom wall of cyclotron chamber 1; bed plate 90 is longitudinally stiffened by means of parallel ribs 92 secured thereto as by screws 93. Mounted on the upper surface of bed plate 90 as by screws 94 and extending for the length thereof to accommodate the car earlier mentioned herein is a pair of rails 95 having upper surfaces of convex cross-section adapted to either a V-rimmed or a flat-rimmed wheel 96, 97, respectively as clearly appears in Fig. 9. The former are two in number and are spaced along the same track (Fig. 8) while the single flat-rimmed wheel 97 rests on the other track midway between the first-named wheels. The wheels are journaled on suitable shafts 98 which are fixed by means such as set screws 99 in parallel bores in an integrally formed carriage block 100 of generally rectangular shape centrally apertured as indicated at 102 and including a surmounting central arch 103 straddling said aperture. Centrally of arch 103 is provided a vertical bore through which extends a shaft 104 having a thrust bearing 105 resting on top of said arch and its co-operating portion fixed to said shaft while below the thickness of said arch portion a bevel gear 106 is keyed to the shaft and retained thereon by a cooperating screw 107 and washer 108. The portion of shaft 104 above bearing 105 is threaded to receive a square nut 109 (Fig. 11) and is surmounted by an upper stop assembly including a cap 110, resilient washer 111 and metal washer 112, the latter assembly in the order named being retained in place by an off center cap screw 113 threaded into the end of shaft 104.

Referring now to Fig. 11 it will be seen that nut 109 with its integral, co-axial pins 114 projecting laterally thereof is the central element of a universal type joint 115 having the elongated and co-axial pins 116 disposed at an angle of 90 degrees to that of pins 114 and co-planar therewith, the parts just described being held in assembled relation by upper and lower, centrally apertured and diametrically grooved, circular plates 117 retained in superposed relation by screws 118. Co-axial with pin 114 to the rear of nut 109 and retained thereon by means such as screw 119 (Fig. 9) threaded therein is a roller bearing 120 which supports the vertical leg 121 of an angle plate 122 the top leg 123 of which is bolted at spaced points indicated at 124 to an upper frame plate 125 of triangular shape and increased thickness to provide great stiffness and rigidity.

The latter plate supports along its diagonal, frame end section 24 to which it is welded as indicated in Fig. 8 while the former has in addition to the support afforded by bearing 120, a pair of depending angles 126 suitably united to the lower surface of such plate and spaced apart by the universal type joint previously described. Through the provision of vertically elongated apertures 127 in the vertically disposed legs 128 of angles 126 the oppositely extending pins 116 are accommodated in supporting relation, providing a three-point support for the plate assembly 122—125.

From the foregoing it will be seen that the frame generally indicated at 21 (Fig. 2) has, therefore, a three-point support near the upper end thereof permitting limited movement axially of pins 116 and some twisting about the universal joint mounting due to the vertically elongated apertures 127. Also end section 24 will be raised or lowered upon rotation of shaft 104, the stop-assembly 110—113 providing a resilient stop limiting the upper travel of universal joint 115.

Referring again to Figs. 8-10 and the structure cooperating with carriage block 100 to constitute the car previously mentioned, it will be observed that an elongated, square shaft 129 journaled in a bearing block 131 mounted on spaced posts 132 at the left end of bed plate 90 extends through aligned horizontal bores in carriage block 100 to the remote or right end (Fig. 2) of bed plate 90 where it is suitably journaled in a vertically extending plate 133 adjustably mounted in any desired manner (not shown) against the adjacent face of a stiff end plate 134 serving to unite bed plate 90 and ribs 92. A universal joint 135 connected to the end of shaft 129 is arranged to be rotated by suitable means disposed outside the chamber 1, as indicated in Fig. 2, thereby rotating shaft 104 through gear 106 meshing with gear 136 which is mounted on and united to a sleeve 137 having at one end a collar 138 broached to receive the square shaft 129 and at the other end, a thrust collar 139 mounted thereon.

Movement of the car along rails 95 is effected by means of an elongated worm shaft 140 extending parallel to but below shaft 129 and journaled in a block 141 carried by posts 142 mounted on one end of bed plate 90 and also journaled in plate 133 at the remote end of bed plate 90. A follower or gear block 143 for worm shaft 140 extends to either side of a median line through arch 103 and has cylindrical end portions which are pivotally mounted in depending extensions 144 secured to carriage block 100 by means such as screws 145. A universal joint 146 connected to the outer end of worm shaft 140 enables the latter to be rotated from outside tank wall 12.

Referring now to Figs. 2 and 12-16, it will be seen that an arrangement quite similar to that just described is provided for adjustably supporting the lower end of frame 21 through its end section 23 certain simplifications being achieved, however, since only the end of the frame is supported. Herein, a generally similar carriage block 100a has supporting wheels, two of which are indicated at 96a resting on rails 95a fixed on bed plate 90a which latter is reinforced by longitudinal spacer ribs 92a and mounted in chamber 1 on magnet pole 3 and bracket 91a. Carriage block 100a carries a vertical shaft 104a having a peripheral flanged portion 105a resting on the adjacent top surface of the former as a bearing and carrying on its lower end the gear 106a mating with a similar gear on sleeve 137a journaled in block 100a and rotated by square shaft 129a through the square-apertured collar 138a secured thereto by set screw 147. Means to cushion the extreme travel of the carriage and associated collar 138a to the left (Fig. 13) may take the form of a square-apertured collar 148 retained on shaft 129a as by a set-screw and adjacent ring 149 of resilient material, these elements being disposed between collar 138a and the cylindrical end of shaft 129a which is journaled in block 131a.

A universal joint generally indicated at 115a includes a square nut 109a travelling on the threaded upper portion of shaft 104a and having diametrically projecting pins 114a seated in upper and lower circular plates 117a aligned by pins 150 retained in one of said plates and extending into recesses in the opposite plate. Means such as screws 118a serve to hold the plates 117a together while elongated bolts 151 having washers 152 adjacent the heads thereof and passing loosely through diametrically opposite apertures in said plates are threaded into bores in upper plate 125a to the upper surface of which the section 23 is attached as by welding. By providing a pair of set screws 153 spaced along a diameter of plates 117a which is normal to the diameter joining the screws 118a a four-point rigid support between the universal joint 115a and upper plate 125a is realized. The latter is apertured as shown for the vertical passage of the shaft 104a and its upper stop components 110a to 113a, inclusive.

Movement of carriage 100a along the rails 95a is effected in a manner similar to that by which carriage 100 is moved, viz: by threaded shaft 140a and a cooperating threaded block 143a having cylindrical end portions journaled in depending extensions of carriage 100a. Shaft 140a is journaled in block 141a at one end of bed plate 90a and in a plate 133a at the other end of plate 90a. Plate 133a also serves to journal the end of square shaft 129a beyond the stop ring 154a, the latter being also provided at 154 on shaft 129 (Fig. 2). The latter figure shows means for enabling rotation of shafts 129a and 140a to be effected from outside wall 12 such means including a U-plate assembly 155 united to bed plate 90a and journalling a pair of cross-shafts 156 disposed one above the other and connected by gearing 157, 158 to shafts 129a and 140a, respectively. The base of assembly 155 also serves as a mounting for plate 133a. Shafts 156 are connected through universal joints 159 to elongated shafts 160 which extend one above the other (Fig. 2) through suitable sealing bushings 161 to the exterior of tank wall 12 where they may be rotated by means generally indicated by 162, the latter means serving also to rotate the shafts extending outwardly from universal joints 135 and 146.

From the foregoing description it will be seen that there has been provided a beam deflector for particle accelerators characterized by extreme flexibility of adjustment and which action may be accomplished by controls disposed outside the accelerator tank and operable throughout the range provided without the necessity of removing the electrical potentials therefrom or adjusting the conductors thereof.

In the preferred form of the invention it is desirable to employ a counterweight as 163 surrounding the central section 22 of the frame 21 to balance the weight of the conductive bars and other components lying on the same side of the axis defined by the supports of Figs. 7 and 12.

Other variants will occur to one skilled in the art. Consequently, it is desired that the invention not be limited to the preferred embodiment disclosed but only by the terms of the following claims.

What is claimed is:

1. In a particle accelerator for the acceleration of ionized particles, a beam deflector comprising a plurality of curved and spaced conductive bars disposed about the path of travel of said ionized particles, a frame having the same general configuration as said bars radially and outwardly spaced from the latter, and a plurality of insulating supporting means intermediate said bars and said frame and interconnecting the same providing thereby an inherently rigid, unitary assembly.

2. In a particle accelerator for the acceleration of ionized particles, a beam deflector comprising a plurality of curved and spaced conductive bars disposed about the path of travel of said ionized particles, a frame having the same general configuration as said bars radially and outwardly spaced from the latter, a plurality of insulating supporting means intermediate said bars and said frame providing therewith an inherently rigid, unitary assembly and a pair of spaced supports for said assembly connected to said frame along a line lying between the latter and said bars.

3. The combination of elements defined in claim 2 and including a counterweight for said bars, said counterweight being connected to said frame intermediate said supports and on the opposite side of said line from said bars.

4. The combination of elements defined in claim 2 and wherein said frame comprises an integral tubular member having an elevated central portion supporting the inner ends of electrical conductors extending inwardly from a source of potential and lower end portions connected to said spaced supports, said latter portions together with their supports being disposed entirely below both said central portion and conductors.

5. The combination of elements defined in claim 2 wherein a centrally located pair of said supporting means includes electrical conductors for supplying pulses of high potential to said bars.

6. The combination of elements defined in claim 2 and means connected to at least one of said supports and extending outside said accelerator for elevating as well as moving laterally said support and its connected assembly.

7. The combination of elements defined in claim 2 and means connected to each of said supports and extending outside said accelerator for elevating as well as moving laterally said support and its connected assembly.

8. In a particle accelerator for the acceleration of ionized particles, a beam deflector comprising a plurality of curved and spaced conductive bars disposed about the path of travel of said ionized particles, a unitary supporting frame for said bars disposed radially outward from the latter, means connected to said frame and spaced therealong for selectively elevating said frame and track means extending in parallelism outwardly from said frame for guiding said first means from an operable to an inoperable position.

9. In a particle accelerator of the evacuated tank type for the acceleration of ionized particles, a beam deflector comprising a plurality of curved and spaced bars disposed about the path of travel of said ionized particles, a retractable frame supporting said bars, a pair of spaced bushings mounted in a wall of said tank and telescoping connectors having ball and socket terminals connecting said bushings and said bars for maintaining electrical continuity to the latter throughout the retractable movement of said frame.

10. The combination of elements defined in claim 9 and including means extending from said frame to the exterior of said tank effecting said retractable movement during operation of said accelerator.

11. The combination of elements defined in claim 9 and including insulating means connected to the inner pair of said ball and socket terminals and said frame providing insulated support of said terminals upon said frame.

12. A beam deflector for particle accelerators of the cyclotron type comprising a plurality of curved and spaced carbon bars, a frame having the same general configuration as said bars and disposed outwardly thereof, a plurality of insulating supporting means intermediate said bars and said frame, a supporting sleeve closely surrounding each of said bars and connected with said supporting means, and means carried by the latter and disposed in pressure transmitting relation with said sleeve for insuring stress distribution along said bars.

13. The combination of elements defined in claim 12 wherein said last means is adjustable with respect to said supporting means to enable the relative positioning of said bars to be accurately made.

14. The combination of elements defined in claim 12 wherein said last means is disposed to produce circumferential pressure upon each of said bars.

15. The combination of elements defined in claim 8 wherein one of said first means is laterally adjustable with respect to said frame.

16. In a particle accelerator for the acceleration of ionized particles, a beam deflector comprising a plurality of curved and spaced conductive bars disposed about the path of travel of said ionized particles, a unitary supporting frame for said bars disposed radially outward from the latter, first means connected to one end of said frame for elevating and for moving the same laterally, second means connected to said frame at a point spaced therealong for elevating and for moving the same laterally, track means supporting and facilitating the lateral movement of said first and second means and drive means connected to both said first and second means and extending outside said accelerator.

17. The combination of elements defined in claim 16 wherein the connection of said second means to said frame is adjustable to permit limited movement relative thereto and in a direction inclined to said lateral movement.

18. The combination of elements defined in claim 16 wherein said drive means includes a plurality of shafts extending between and parallel to said track means.

D. THEODORE SCALISE.

References Cited in the file of this patent

UNITED STATES PATENTS

| Number | Name | Date |
| --- | --- | --- |
| 2,179,097 | Law | Nov. 7, 1939 |
| 2,331,788 | Baldwin | Oct. 12, 1943 |
| 2,533,859 | Wideroe | Dec. 12, 1950 |
| 2,626,351 | Powell | Jan. 20, 1953 |